United States Patent
Cho

(10) Patent No.: US 7,898,224 B2
(45) Date of Patent: Mar. 1, 2011

(54) METHOD FOR SWITCHING LOW-POWER USING AC AND SYSTEM FOR PERFORMING THE SAME AND POWER SUPPLY FOR USING THE SYSTEM

(76) Inventor: Young-Chang Cho, Cheongju (KR)

( * ) Notice: Subject to any disclaimer, the term of this patent is extended or adjusted under 35 U.S.C. 154(b) by 664 days.

(21) Appl. No.: 11/596,697

(22) PCT Filed: Jun. 10, 2005

(86) PCT No.: PCT/KR2005/001768
§ 371 (c)(1),
(2), (4) Date: Feb. 1, 2008

(87) PCT Pub. No.: WO2005/122376
PCT Pub. Date: Dec. 22, 2005

(65) Prior Publication Data
US 2008/0253157 A1 Oct. 16, 2008

(30) Foreign Application Priority Data
Jun. 14, 2004 (KR) .................. 10-2004-0043476

(51) Int. Cl.
*G05F 5/00* (2006.01)
(52) U.S. Cl. ........................................ 323/215; 323/217
(58) Field of Classification Search .............. 323/213, 323/214, 216, 217, 218, 219, 84, 88, 52, 323/53, 81, 125, 127
See application file for complete search history.

(56) References Cited

U.S. PATENT DOCUMENTS

| 4,321,662 | A | * | 3/1982 | Yokoyama | 363/86 |
| 4,325,112 | A | * | 4/1982 | Otsuka | 363/42 |
| 4,685,046 | A | * | 8/1987 | Sanders | 363/89 |
| 4,787,007 | A | * | 11/1988 | Matsumura et al. | 361/98 |
| 5,003,455 | A | | 3/1991 | Miller | |
| 5,450,307 | A | * | 9/1995 | Yasumura | 363/47 |
| 5,708,577 | A | * | 1/1998 | Mckinley | 363/89 |
| 2003/0043597 | A1 | * | 3/2003 | Betts-LaCroix | 363/16 |
| 2006/0139823 | A1 | * | 6/2006 | Shoji et al. | 361/56 |

FOREIGN PATENT DOCUMENTS
JP 05-064432 3/1993

OTHER PUBLICATIONS

Muhammad H. Rashid; Power Electronic Circuits, Devices, and Applications, $2^{nd}$ Edition; prentice Hall, Englewood Cliffs, NJ; 1993; Ch.5-11 (Symmetrical Angle Control), pp. 167-176.

* cited by examiner

*Primary Examiner* — Adolf Berhane
*Assistant Examiner* — Jeffrey Gblende
(74) *Attorney, Agent, or Firm* — Greer, Burns & Crain, Ltd.

(57) ABSTRACT

A power control method using AC power, the method being capable of performing: low power control that passes only two portions of positive direction waves of each one-cycle sine wave of the AC power and only two portions of negative direction waves of each one-cycle sine wave of the AC power, which have voltage levels lower than a set reference voltage level, through a system; and high power control that does not pass only two portions of positive direction waves of each one-cycle sine wave of the AC power and only two portions of negative direction waves of each one-cycle sine wave of the AC power, which have voltage levels lower than a set reference voltage level, through the system.

8 Claims, 3 Drawing Sheets

[Fig. 1]
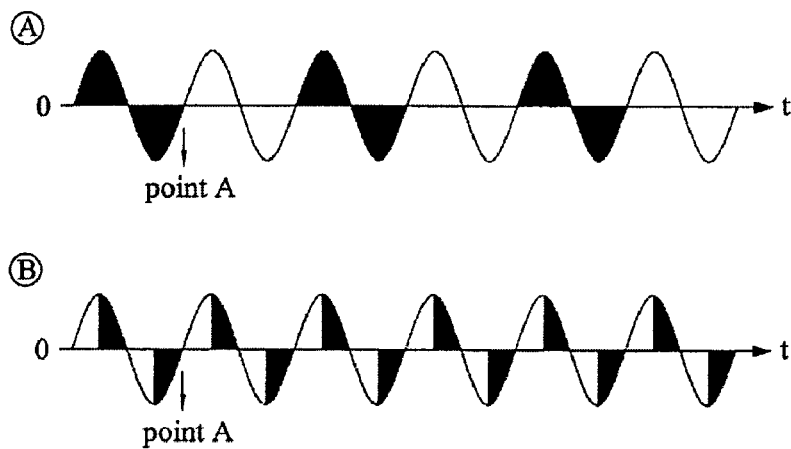
[Fig. 2]
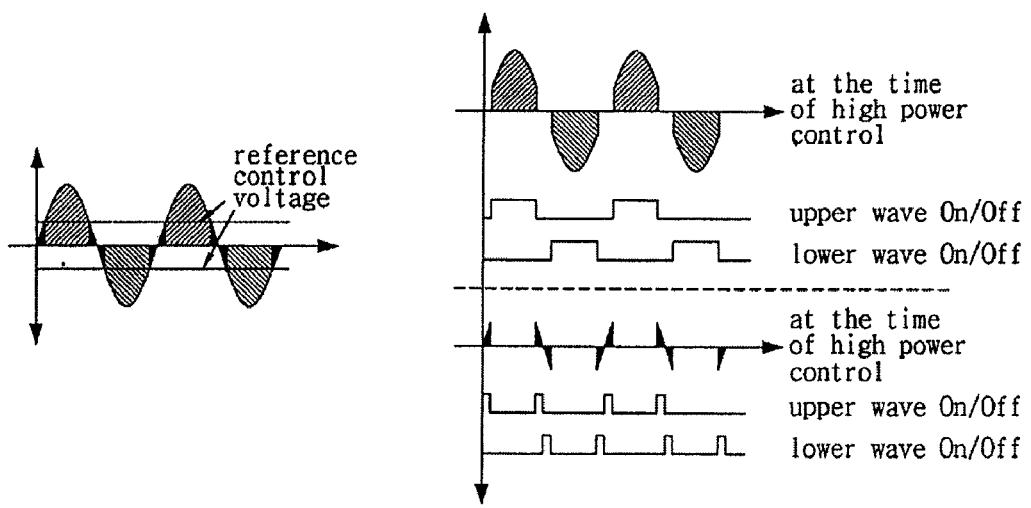
[Fig. 3]
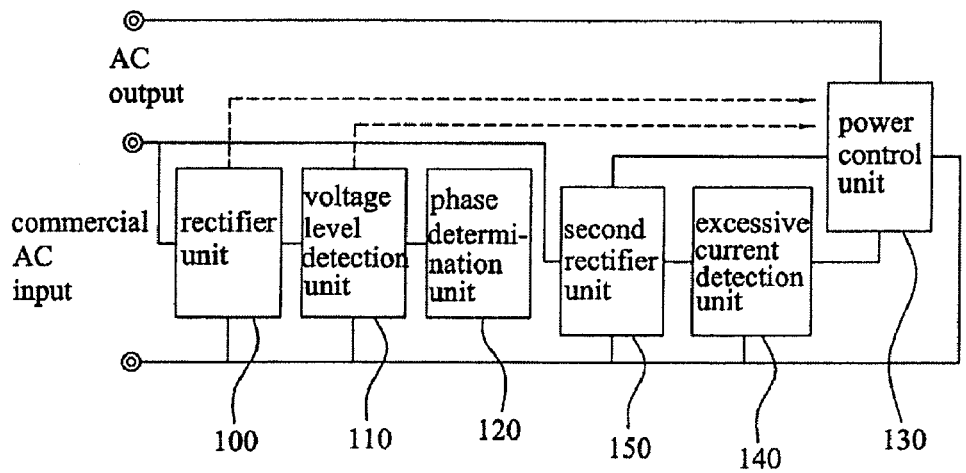

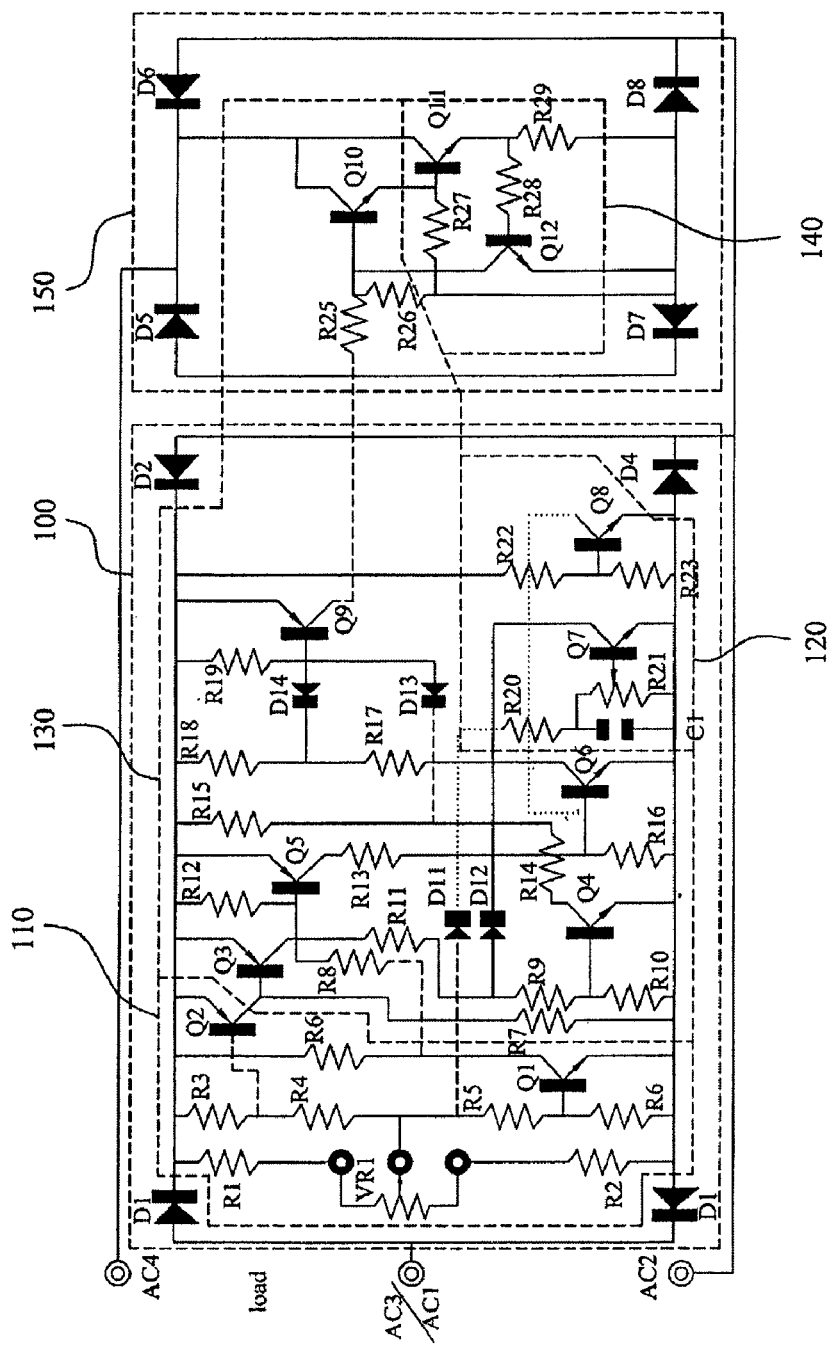
[Fig. 4]
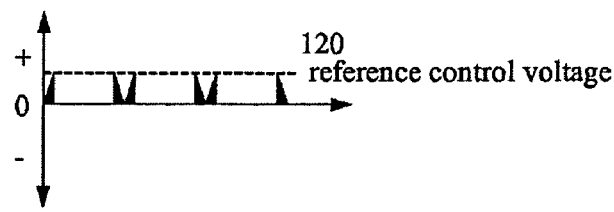
[Fig. 5]

[Fig. 6]
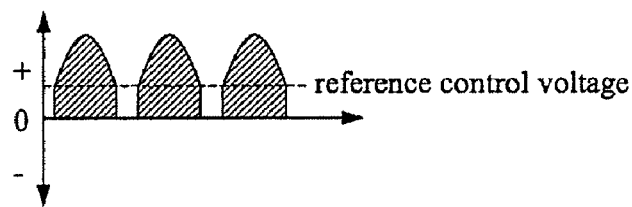
[Fig. 7]
[Fig. 8]
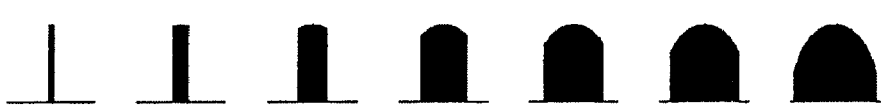
[Fig. 9]
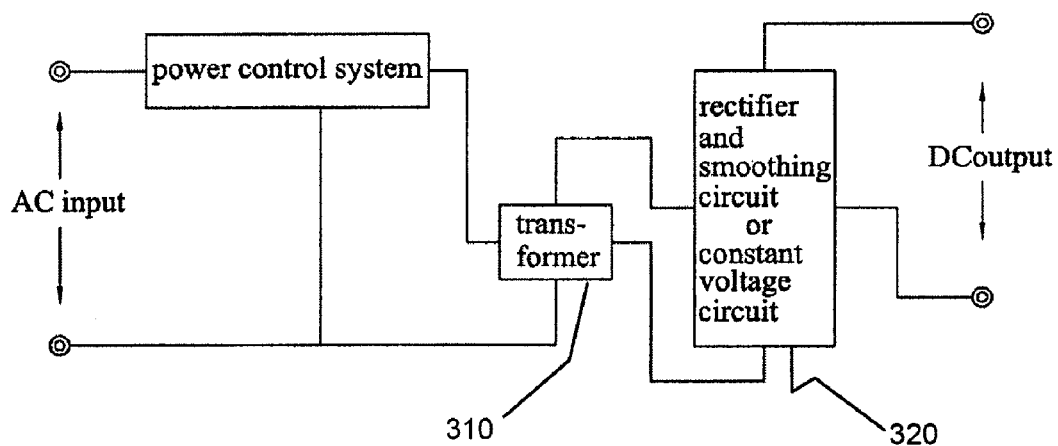

METHOD FOR SWITCHING LOW-POWER USING AC AND SYSTEM FOR PERFORMING THE SAME AND POWER SUPPLY FOR USING THE SYSTEM

TECHNICAL FIELD

The present invention relates to a power control method using alternating current power, a system for performing the method and a power supply using the system, which can stably control alternating current power to 0%~100% of the power level thereof when supplying low voltage alternating current power directly from commercial alternating current power, thus having optimal efficiency, and which enable the integration of component circuits.

BACKGROUND ART

Generally, power control using Alternating Current AC power employs a zero-crossing control method and a phase control method. In the zero-crossing control method, when voltage is zero, that is, when AC power advancing while forming a sine wave advances by one cycle and reaches point A having zero voltage, as illustrated in FIG. 1A, On/Off control is performed. In order to supply 50% of supplied AC power, power is controlled in such a way as to repeat an On/Off operation every cycle in the zero-crossing control method.

Such a zero-crossing method is superior from the point of view of power noise.

However, the zero-crossing method requires a circuit for finding the zero point of AC power, that is, the point where voltage is zero after a cycle has completed, so that economical efficiency is low. Accordingly, the zero-crossing method can be utilized for expensive equipment, but has a disadvantage in that uniform power is not supplied in power control in which a control rate is low compared to the amount of AC power.

The phase control method controls power, which is supplied to a load, by varying the phase of supplied AC power as shown in FIG. 1B, so that the method is simple and, thus, may be used throughout all of industry. However, the phase control method has disadvantages in that noise is high and the method is not stable for power control for less than 50% of supplied AC power because switching on and off is performed at high voltage positions, and uniform power is not supplied.

That is, the conventional zero-crossing method and phase control method perform the On/Off control of power based on phase according to time, whereas a novel method proposed by the present invention performs the On/Off control of power based on the amount of voltage.

DISCLOSURE OF INVENTION

Technical Problem

The present invention has been invented so as to overcome the disadvantages of the zero-crossing method and the phase control method, and a first object of the present invention is to provide a power control method, which can uniformly and stably control supplied AC power, and enables a super-small size circuit to be implemented so as to achieve optimal technical efficiency and economic efficiency at the time of supplying required power while controlling AC power.

Furthermore, a second object of the present invention is to provide a power control system that is composed of integrated circuits that prevents excessive current from being applied to loads by frequently supplying low level voltage.

Furthermore, a second object of the present invention is to provide a power supply using the power control system that is composed of integrated circuits.

Technical Solution

In order to achieve the first object, the present invention provides a power control method using Alternating Current (AC) power, the method being capable of performing: low power control that passes only two portions of (+) positive direction waves of each one-cycle sine wave of the AC power and only two portions of (−) negative direction waves of each one-cycle sine wave of the AC power, which have voltage levels lower than a set reference voltage level, through a system; and high power control that does not pass only two portions of (+) positive direction waves of each one-cycle sine wave of the AC power and only two portions of (−) negative direction waves of each one-cycle sine wave of the AC power, which have voltage levels lower than a set reference voltage level, through the system.

In order to achieve the second object, the present invention provides a power control system using AC power, including:

a rectifier unit configured to full-wave-rectify input AC power and composed of bridge diodes;

a voltage level detection unit connected to the rectifier unit, and configured to set reference control voltage and output a signal according to a set control criterion;

a phase determination unit configured to control the switching operation of the input AC power according to the amount of the reference control voltage set by the voltage level detection unit;

a power control unit connected to the voltage level detection unit and the phase determination unit, and configured to switch on and output parts of the power, which have voltage levels lower than the reference control voltage, at the time of low power control, and switch on and output parts of the power, which have voltage levels higher than the reference control voltage, at the time of high power control; and an excessive current detection unit connected to the output side of the power control unit, and configured to serve as a protection circuit for cutting off supply of power when excessive current is included in the output power.

Furthermore, in order to achieve the third object, the present invention provides a power supply constructed by connecting a transformer to output terminals of the power control system and connecting a known rectifying and smoothing circuit or constant voltage circuit to output terminals of the transformer, wherein the power supply operates to vary the voltage of AC power, which is detected through the power control system, using the transformer, and to convert the varied voltage into direct current voltage using the rectifying and smoothing circuit or constant voltage circuit.

The present invention is connected between the loads of power supply terminals and supplies power through direct switching operation, so that it has minimal loss and a simple construction.

BRIEF DESCRIPTION OF THE DRAWINGS

FIGS. 1A and 1B are waveform diagrams illustrating a zero-crossing method and a phase control method that are used for general power control;

FIG. 2 is a waveform diagram illustrating a power control method according to the present invention;

FIG. 3 is a block diagram illustrating the construction of a power control system according to the present invention;

FIG. 4 is an embodiment of a circuit that implements the power control system according to the present invention;

FIG. 5 is a waveform diagram in the case where the power control system according to the present invention outputs low power having low voltage levels;

FIG. 6 is a waveform diagram in the case where the power control system according to the present invention outputs high power having high voltage levels;

FIG. 7 is a waveform diagram illustrating the various waveforms of voltages output from the power control system of the present invention at the time of low power control;

FIG. 8 is a waveform diagram illustrating the various waveforms of voltages output from the power control system of the present invention at the time of high power control; and.

FIG. 9 is a block diagram illustrating an embodiment in which a power supply is implemented using the power control system of the present invention.

BEST MODE FOR CARRYING OUT THE INVENTION

With reference to the accompanying drawings, preferred embodiments of the present invention are described in detail below.

FIG. 2 is a waveform diagram illustrating a power control method according to the present invention, FIG. 3 is a block diagram illustrating the construction of a power control system according to the present invention, FIG. 4 is an embodiment of a circuit that implements the power control system according to the present invention, FIG. 5 is a waveform diagram in the case where the power control system according to the present invention outputs low power having low voltage levels, FIG. 6 is a waveform diagram in the case where the power control system according to the present invention outputs high power having high voltage levels, and FIG. 7 is a block diagram illustrating an embodiment in which a power supply is implemented using the power control system of the present invention.

The power control method according to the present invention, as shown in FIG. 2, sets a power level for the sine waveform of input AC power, and, in high power control in which a power level required at output terminals is below 50% of the power level of input AC power, switches on only the portions of (+) positive direction waves and (−) negative direction waves having power levels lower than a set power level and passes the portions through the system.

Furthermore, in high power control in which a power level required at output terminals is above 50% of the power level of the input AC power, control is performed such that only the portions of (+) positive direction waves and (−) negative direction waves having power levels higher than the set power level are switched on and passed through the system.

Accordingly, in the entire power control, control is performed such that the On/Off control of AC power is performed at low power level portions, so that switching noise is low compared to the phase control method in which On/Off control is performed at high power level portions, and four switching operations are performed in each one-cycle waveform of AC power, that is, (+) positive direction waves and (−) negative direction waves, so that output having even voltage levels are performed compared to the zero-crossing method.

As shown in FIG. 3, in the power control system according to the present invention, a rectifier unit 100 for full-wave-rectifying commercial AC power is connected to output terminals for commercial AC power, and a voltage level detection unit 110 for detecting the voltage level of a sine waveform is connected to the output terminal of the rectifier unit 100. A phase determination unit 120 for performing switching on/off according to the detected voltage level is connected to the output terminal of the detection unit 120. The phase determination unit 120 prevents the output of low power when the phase of the input AC power is higher than the voltage level set by the voltage level detection unit 110, and prevents the output of high power when the phase of the input AC power is lower than the voltage level set by the voltage level detection unit 110, thus operating such that power control is achieved at a low voltage level.

A power control unit 130 for performing switching so as to pass part of input AC power, which has power levels necessary at an output side, therethrough is connected to the output side of the voltage level detection unit 110. An excessive current detection unit 140 serving as a protection circuit for cutting off supply when excessive current flows is connected to the power control unit 130, and the excessive current detection unit 140 is connected to a second rectifier unit 150 for full-wave-rectifying AC power.

Assuming that only 10% of input AC power is required (for example, input AC power is 100V and required power is 10V), the present invention constructed as described above employs a method of repeating a time period in which the power control unit 110 passes voltage in the above range through the system and a time period in which the power control unit 110 does not pass voltage above the above range through the system until the voltage level detection unit 120 detects low voltage power level below 20% of the input AC power, thus supplying 10% of the input power, not the conventional power control method in which 100% of the power is passed through the system and a non-conduction time period ten times a conduction time period is provided, thus reducing the evenness of output power. Accordingly, the present invention is a method of supplying power having considerably improved evenness in power supply, and a method capable of replacing transformers in many applications.

The power control system according to the present invention may be implemented using a circuit as shown in FIG. 4, and the circuit of FIG. 4 is composed of a switching circuit that is composed of a simple circuit without a holding circuit, which operates like a triac or SCR.

The rectifier unit 100 is composed of bridge diodes D1~D4, which are connected to an output terminal for commercial AC power, and full-wave-rectifies the commercial AC power.

In the construction of the voltage level detection unit 110, smoothing resistors R2 and R3 are connected to both ends of a variable resistor R1 connected to the output side of the bridge diodes D1~D4 of the rectifier unit 100. A variable resistor VR1 is constructed to output signals between a pair of resistors R3 and R4 connected in series and between another pair of resistors R5 and R6 connected in series. The base terminal of a PNP-type second transistor Q2 is connected between a pair of resistors R3 and R4, and the base terminal of an NPN-type first transistor Q1 is connected between another pair of resistors R5 and R6.

In the construction of the power control unit 130, the base terminal of a PNP-type third transistor Q3 is connected to the emitter terminal of the second transistor Q2 of the voltage level detection unit 110, the emitter terminal of the third transistor Q3 is connected to an first side output terminal of the bridge diodes D1~D4, and the collector terminal of the third transistor Q3 is connected to an second side output terminal of the bridge diodes D1~D4 through a plurality of resistors R9, R10 and R11. The base terminal of a PNP-type fifth transistor Q5 is connected to the collector terminal of the first transistor Q1 of the voltage level detection unit 110 through a resistor R8, the emitter terminal of the fifth transistor Q5 is connected to a first side output terminal of the bridge diodes D1~D4, and the collector terminal of the fifth transistor Q5 is connected to a second side output terminal of the bridge diodes D1~D4 through a plurality of resistors R13 and R16. The base terminal of the fourth transistor Q4 is connected between the appropriate ones R9 and R10 of resistors R9, R10 and R11 connected to the collector terminal of the third transistor Q3, the emitter terminal of the fourth transistor Q4 is connected to a first side output terminal of the bridge diodes D1~D4, and the collector terminal of the fourth transistor Q4 is connected to an second side output terminal of the bridge diodes D1~D4 through a plurality of resistors R14 and R15. The base terminal of the sixth transistor Q6 is connected between resistors R13 and R16 connected to the collector terminal of the fifth transistor Q5, the emitter terminal of the sixth transistor Q6 is connected to a first side output terminal of the bridge diodes D1~D4, and the collector terminal of the sixth transistor Q6 is connected to an second side output terminal of the bridge diodes D1~D4 through a plurality of resistors R17 and R18. The base terminal of a ninth transistor Q9 is connected between resistors R17 and R18, which are connected to the collector terminal of the sixth transistor Q6, through the diode D14, and between resistors R14 and R15, which are connected to the collector terminal of the fourth transistor Q4, through a diode D13. The emitter terminal of the ninth transistor Q9 is connected to a first side terminal of the bridge diodes D1~D4. The collector terminal of the ninth transistor Q9 is constructed to provide input to the base terminal of a tenth transistor Q10 so as to switch on and off power to load terminals AC3 and AC4 through a resistor R25.

In this case, the phase determination unit 120 is constructed such that the base terminal of a seventh transistor Q7 is connected to a diode D11, which is connected to the variable resistor VR1 of the voltage level detection unit 110, through resistors R20 and R21, the collector terminal of the seventh transistor Q7 is connected to the base terminals of the fourth transistor Q4 and the eighth transistor Q8 through the diode D12 and the resistor R8, and the collector terminal of the eighth transistor Q8 is connected to the base terminal of the sixth transistor Q6.

In the power control circuit constructed as described above, in accordance with the present invention, when commercial AC power is applied through terminals AC1 and AC2, AC power advancing while forming a sine wave is converted into a full-wave-rectified waveform through the bridge diodes D1~D4 of the rectifier unit 100. For the waveform full-wave-rectified by the bridge diodes D1~D4, the voltage level for the switching on and off of the AC power waveform is set according to the value of the variable resistor VR1 of the voltage level detection unit 110.

When a full-wave-rectified waveform having power levels higher than a value set through the variable resistor VR1 is input, the first transistor Q1 connected to the output side of the variable resistor VR1 of the voltage level detection 110 is turned on and, thus, the fifth transistor Q5 of the power control unit 130 is turned on and the sixth transistor Q6 connected to the collector terminal of the transistor Q5 is also turned on. As the sixth transistor Q6 is turned on, the sixth transistor Q6 connected to the collector terminal of the transistor Q5 is turned on. As the sixth transistor Q6 is turned on, power maintained at the resistor R19 of the power control unit 130 is applied to the base terminal of the switching transistor Q9 through the diode D14 and, thus, the ninth transistor Q9 is turned on. Accordingly, the tenth transistor Q10 is turned on, so that only power having voltage levels higher than the value (reference control voltage) set through the variable resistor VR1 is output through output terminals AC3 and AC4. That is, as shown in FIG. 2, high power having voltage levels higher than the reference control voltage set by the variable resistor VR1 is output. At this time, when the first transistor Q1 of the voltage level detection unit 110 operates, the second transistor Q1 is also turned on and, thus, turns off the third transistor Q3 of the power control unit 130.

In the above case, when a voltage level required at the load terminals is below 50% of the voltage level of input power, that is, the value of the variable resistor VR1 of the voltage level detection unit 110 is set so as to pass only low power, which is below 50% of the power level of input AC power, through the variable resistor VR1, power applied to resistors R3~R6 through the variable resistor VR1 is relatively low, so that the first transistor Q1 of the voltage level detection unit 110 does not operate and the second transistor Q2 also does not operate. Accordingly, the third transistor Q3 of the power control unit 130 is turned on. As the third transistor Q3 is turned on, the fourth transistor Q4 is turned on. As the fourth transistor Q4 is turned on, power maintained at the resistor R19 of the power control unit 130 is applied to the base terminal of the ninth transistor Q9 through a diode D13 and, thus, the ninth transistor Q9 is turned on. Accordingly, the tenth transistor Q10 is turned on and, thus, only low power having voltage levels lower than the value (reference control voltage) set through the variable resistor VR1 is output through the output terminals AC3 and AC4.

In the case where the voltage level set by the voltage level detection unit 110 is high (in the case of high power output) as shown in FIG. 6, a signal is applied to the base terminal of the seventh transistor Q7 of the determination unit 120 through the variable resistor VR1 and diode D11 of the voltage level detection unit 110 and, thus, the seventh transistor Q7 is turned on. Accordingly, the power applied to the base terminal of the fourth transistor Q4 of the power control unit 130 is cut off and, thus, the fourth transistor Q4 is turned off, thus preventing power having voltage levels lower than the value (reference control value) set by the variable resistor VR1 from being output. At this time, the eighth transistor Q8 of the phase determination unit 120 is turned off.

Furthermore, in the case where the voltage level set by the voltage level detection unit 110 is low (in the case of low power output) as shown in FIG. 6, a signal is not applied to the base terminal of the seventh transistor Q7 of the phase determination unit 120 through the variable resistor VR1 and diode D11 of the voltage level detection unit 110, so that the seventh transistor Q7 is turned off and the eighth transistor Q8 is turned on. As a result, the power applied to the base terminal of the sixth transistor Q6 of the power control unit 130 is cut off and the sixth transistor Q6 is turned off, thus preventing power higher than the value (reference control voltage) set by the variable resistor VR1 from being output.

In accordance with the present invention, as shown in FIG. 6, in the control of high power that switches on only power having voltage levels higher than the reference control voltage set through the variable resistor VR1 of the voltage level detection unit 110, the first, fifth and sixth transistors Q1, Q5, Q6 of the power control unit 130 operate, so that only the (+) positive direction waves of the AC power, that is, the center portions of upper waves, and only the (−) negative direction waves thereof, that is, the center portions of lower waves, are switched on.

In contrast, in the control of low power that switches on only power having voltage levels lower than the reference control voltage set through the variable resistor VR1 of the voltage level detection unit 110, the third and fourth transistors Q3 and Q4 of the power control unit 130 operate, so that the (+) positive direction waves of AC power, that is, the center portions of upper waves, and only the (−) negative direction waves thereof, that is, the side portions of lower waves, are switched on.

That is, in the control of low power, power having voltage levels lower than the reference control voltage set through the variable resistor VR1 is input, so that the first transistor Q1 is turned off, the third transistor Q3 is turned on through the resistor R7 and, thus, the fourth transistor Q4 is turned on through the resistors R11 and R9, thereby turning on the ninth transistor Q9 through the resistor R14 and the diode D13. As a result, output is controlled in the range from 0% to 100% according to the control value of the variable resistor VR1 for every AC half waveform as shown in the waveform diagram of FIG. 7. This mode is appropriate for the case of requiring low voltage or low voltage-centric control.

In the output mode of FIG. 7, switching is performed at high voltage, so that the output mode is appropriate for the case mainly requiring low voltage or requiring low voltage-centric control.

In contrast, when power having voltage levels higher than the reference control voltage set through the variable resistor VR1 is input, the first transistor Q1 is turned on and the fifth transistor Q5 is turned on through the resistor R8, the sixth transistor Q6 is turned on through the resistor R13 and, thus, the ninth transistor Q9 is turned on through the resistor R17 and the diode D14. As a result, output is controlled according to the control value of the variable resistor VR1 for every AC half waveform as shown in the waveform diagram of FIG. 8, so that power is controlled in the range from 0% to 100%. The output mode of FIG. 8 performs excellent control for high power control, and is not desirable for low power control as shown in FIG. 7 due to a high pulse form switching operation.

In conclusion, the output control of FIG. 7 has excellent low voltage control characteristics while the output control of FIG. 8 has excellent high voltage control characteristics. In the case where control from 0% to 100% is required, the phase determination unit 120 detects the control value of the variable resistor VR1 through the diode D11, control the operation of the seventh transistor Q7 and the eighth transistor Q8 through the resistor R20, and performs a desired one of the output modes of FIG. 7 and FIG. 8 according to the set value of the variable resistor VR1.

That is, according to the value of the variable resistor VR1, the phase determination unit 120 controls the seventh and eighth transistors Q7 and Q8 so as to output the waveform of FIG. 7 in the case of low power control, and so as to output the waveform of FIG. 8 in the case of high power control so that any one of the fourth and fifth transistors Q4 and Q5 operates. The resistor R21 constituting part of the phase determination unit 120 may have a fixed value so as to adjust the on/off cycles of the output control of FIG. 7 and FIG. 8.

Furthermore, in the power control system according to the present invention, the excessive current detection unit 140 operates to protect the circuit from excessive current by limiting current output in such a way that, when current flowing through an eleventh transistor Q11 connected to the output terminals is excessive, a twelfth transistor Q12 is turned on by the excessive current and, thus, turns off the ninth transistor Q9 of the power control unit 130.

The above-described advantages of the present invention are prominent when compared with the conventional power control methods, as shown in FIGS. 1 and 2. The zero-crossing control shown in FIG. 1 causes low switching noise because On/Off operations are performed when the voltage level of input AC voltage is zero, but has the widest range of variation in voltage because, in order to output 50% of the voltage level of the AC power, one cycle is transmitted and one remaining cycle is not transmitted.

Furthermore, the phase control has the highest switching noise because a switching-on operation is performed when the voltage level is at a peak, but has the advantage of outputting a voltage level four times as even as the zero-crossing control because, in order to output 50% of the voltage level of input AC power, half of the positive (+) direction wave of one cycle and half of the negative (−) direction wave are evenly transmitted.

As shown in FIG. 2, in order to output low output lower than 50% of input AC power, the present invention passes two (+) positive direction ones of a one-cycle sine wave constituting part of the input AC power and two wave portions of (−) negative direction waves having voltage levels lower than the reference voltage level set through the detection unit 110, through the system. In contrast, in the case where high power above 50% is required at the output terminals, the present invention does not pass two (+) direction waves of a one-cycle sine wave constituting part of the AC power and two wave portions of the (−) negative direction waves lower than the reference voltage level set by the level detection unit 110 through the system. Accordingly, the present invention may have high switching noise, but is advantageous in that as the output power level can be transmitted two times as even as the phase control, the system can be implemented using simple circuits, thus having economic efficiency, and it is further excellent in the case where an output power level is low.

The present invention has advantages that increase in inverse proportion to a voltage level as described above. Accordingly, in the case where the present invention is used as a low voltage DC power supply that rectifies output controlled to low voltage, the present invention is the most efficient of the conventional methods of converting AC voltage down to DC voltage and, accordingly, has a strong possibility of being used as a super-small power supply. That is, when the low voltage control systems of FIGS. 4 and 5 are implemented using ICs, an output of 3V~12V and several tens of watts can be achieved using a 10 mm cubic body.

The present invention is a method that implements component parts in IC form, is composed only of On/Off control operations and has infrequent switching operations, so that a maximum efficiency can be achieved. The present invention can be used as a voltage step-down transformer or power controller element in various fields.

Furthermore, as shown in FIG. 9, a power supply may be constructed by connecting a small transformer 310 to the output terminals of the power control system according to the present invention and connecting a known rectifying and smoothing circuit or constant voltage circuit 320 to the output terminals of the transformer 310. In this case, the power supply that has a reduced number of component parts and improved economic efficiency can be constructed.

For power supplies that perform operations of conducting and supplying only voltage lower than a predetermined power level through the detection and switching of a power level in the power control system, varying the voltage using the small transformer 310 and converting the varied voltage into direct current voltage using the known rectifying and smoothing circuit or constant voltage circuit 320, the number of parts is reduced and economic efficiency is improved.

INDUSTRIAL APPLICABILITY

As described above, the present invention employs the switching method that performs voltage level control on the voltage waveform of AC voltage, so that the present invention can efficiently and stably perform low voltage control, can overcome the disadvantages of phase control, which is unstable when control is performed for 50% or less of the voltage level of AC power, and zero-crossing control, in which uniform control is not formed, and can implement a power supply for producing low DC voltage directly from commercial AC voltage in a super-small size. The present invention can be implemented using a circuit composed of only resistors and transistors, so that the present invention can be implemented using a small IC, thus allowing a highly efficient and safe circuit to be designed because the circuit has high efficiency and, therefore, enabling a power control device having economical efficiency to be implemented.

Although the preferred embodiments of the present invention have been described in detail with reference to the accompanying drawings as described above, the present invention is not limited to the embodiments, but modifications and variations can be made by those skilled in the art without departing from the scope of the technical spirit of the present invention.

The invention claimed is:

1. A power control method using AC power, the method being capable of performing: low power control that passes only two portions of positive direction waves of each one-cycle sine wave of the AC power and only two portions of negative direction waves of each one-cycle sine wave of the AC power, which have voltage levels lower than a set reference voltage level, through a system; and high power control that does not pass only two portions of positive direction waves of each one-cycle sine wave of the AC power and only two portions of negative direction waves of each one-cycle sine wave of the AC power, which have voltage levels lower than a set reference voltage level, through the system, wherein the high power control comprises the steps of: full-wave-rectifying input AC power; setting reference control voltage for the full-wave-rectified AC power; and performing control such that only waveform portions of the full-wave-rectified AC power, which have voltage levels higher than the set reference control voltage, can be passed through a system and, thus, only center portions of positive direction waves and negative direction waves of the input AC power, which have voltage levels higher than the set reference control voltage, can be passed through the system.

2. The power control method as set forth in claim 1, wherein the low power control comprises the steps of: full-wave-rectifying input AC power; setting reference control voltage for the full-wave-rectified AC power; and performing control such that only waveform portions of the full- wave-rectified AC power, which have voltage levels lower than the set reference control voltage, can be passed through a system and, thus, only side portions of positive direction waves and negative direction waves of the input AC power, which have voltage levels lower than the set reference control voltage, can be passed through the system.

3. A power control system using AC power, comprising: a rectifier unit configured to full-wave-rectify input AC power and composed of bridge diodes;
a voltage level detection unit connected to the rectifier unit, and configured to set reference control voltage and output a signal according to a set control criterion;
a phase determination unit configured to control switching operation of the input AC power according to an amount of the reference control voltage set by the voltage level detection unit;
a power control unit connected to the voltage level detection unit and the phase determination unit, and configured to switch on and output parts of the power, which have voltage levels lower than the reference control voltage, at the time of low power control, and switch on and output parts of the power, which have voltage levels higher than the reference control voltage, at the time of high power control;
an excessive current detection unit connected to an output side of the power control unit, and configured to serve as a protection circuit for cutting off supply of power when excessive current is included in the output power; and
wherein the voltage level detection unit is constructed such that smoothing resistors are connected to both ends of a variable resistor connected to an output side of the bridge diodes of the rectifier unit, a variable resistor is constructed to output signals between a pair of resistors connected in series and between another pair of resistors connected in series, a base terminal of a PNP-type second transistor is connected between a pair of resistors, and a base terminal of an NPN-type first transistor is connected between another pair of resistors.

4. The power control system as set forth in claim 3, wherein the power control unit comprises:
a PNP-type third transistor whose base terminal is connected to an emitter terminal of a second transistor of the voltage level detection. unit, whose emitter terminal is connected to a first side output terminal of the bridge diodes, and whose collector terminal is connected to a second side output terminal of the bridge diodes through a plurality of resistors; a fourth transistor whose base terminal is connected between appropriate ones of resistors connected to a collector terminal of the third transistor, whose emitter terminal is connected to a first side output terminal of the bridge diodes, and whose collector terminal is connected to a second side output terminal of the bridge diodes through a plurality of resistors, a PNP-type fifth transistor whose base terminal is connected to a collector terminal of a first transistor of the voltage level detection unit through a resistor, whose emitter terminal is connected to a first side output terminal of the bridge diodes, and whose collector terminal is connected to the second side output terminal of the bridge diodes through a plurality of resistors; a sixth transistor whose base terminal is connected between resistors connected to the collector terminal of the fifth transistor, whose emitter terminal is connected to the first side output terminal of the bridge diodes, and whose collector terminal is connected to the second side output terminal of the bridge diodes through a plurality of resistors; and a ninth transistor whose base terminal is connected between resistors, which are connected to the collector terminal of the sixth transistor through the diode, and between resistors, which are connected to the collector terminal of the fourth transistor, through a diode, whose emitter terminal is connected to the first side terminal of the bridge diodes, whose collector terminal is constructed to provide input to a base terminal of a tenth transistor so as to switch on and off power to load terminals through a resistor.

5. The power control system as set forth in claim 3, wherein the phase de- termination unit is constructed such that a base terminal of a seventh transistor is connected to a diode, which is connected to the variable resistor of the voltage level detection unit, through resistors, a collector terminal of the seventh transistor is connected to base terminals of the fourth transistor and the eighth transistor through the diode and the resistor, and the collector terminal of the eighth transistor is connected to a base terminal of the sixth transistor.

6. The power control system as set forth in claim 5, wherein a condenser is connected in series to the resistor of the phase determination unit, and in parallel to the resistor of the phase determination unit.

7. The power control system as set forth in claim 5, wherein the resistor of the phase determination unit is a variable resistor.

8. A power control system using AC power, comprising: a rectifier unit configured to full-wave-rectify input AC power and composed of bridge diodes;
- a voltage level detection unit connected to the rectifier unit, and configured to set reference control voltage and output a signal according to a set control criterion;
- a phase determination unit configured to control switching operation of the input AC power according to an amount of the reference control voltage set by the voltage level detection unit;
- a power control unit connected to the voltage level detection unit and the phase determination unit, and configured to switch on and output parts of the power, which have voltage levels lower than the reference control voltage, at the time of low power control, and switch on and output parts of the power, which have voltage levels higher than the reference control voltage, at the time of high power control;
- an excessive current detection unit connected to an output side of the power control unit, and configured to serve as a protection circuit for cutting off supply of power when excessive current is included in the output power; and
- wherein the phase de- termination unit is constructed such that a base terminal of a seventh transistor is connected to a diode, which is connected to the variable resistor of the voltage level detection unit, through. resistors, a collector terminal of the seventh transistor is connected to base terminals of the fourth transistor and the eighth transistor through the diode and the resistor, and the collector terminal of the eighth transistor is connected to a base terminal of the sixth transistor.

* * * * *